Figure 1:
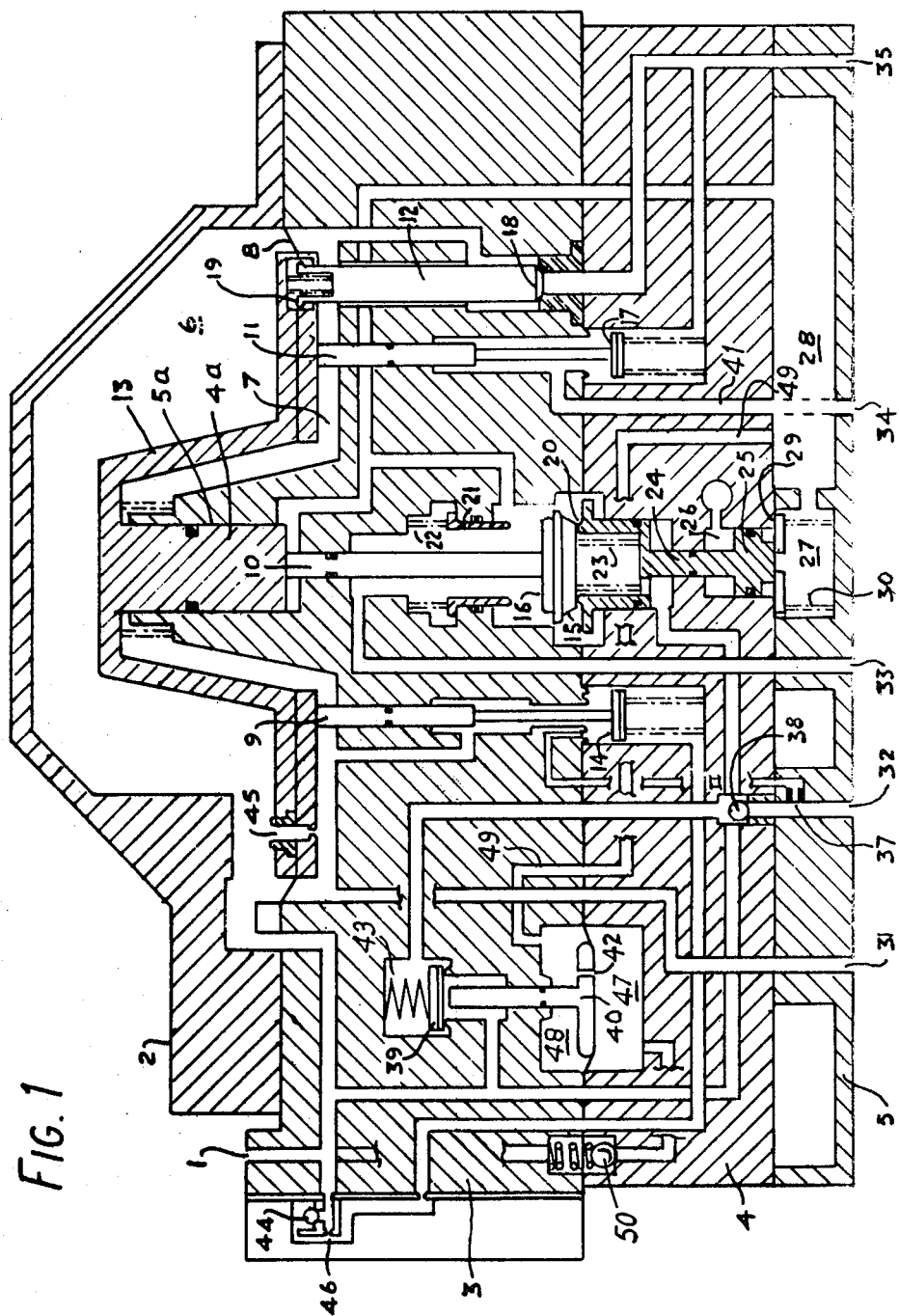

United States Patent [19]

Wickham

[11] 4,095,850
[45] Jun. 20, 1978

[54] BRAKE CONTROL VALVE APPARATUS

[75] Inventor: David John Wickham, London, England

[73] Assignee: Westinghouse Brake and Signal Co. Ltd., England

[21] Appl. No.: 810,723

[22] Filed: Jun. 28, 1977

Related U.S. Application Data

[63] Continuation-in-part of Ser. No. 638,463, Dec. 8, 1975, Pat. No. 4,050,745.

[51] Int. Cl.² .............................................. B60T 15/52
[52] U.S. Cl. ........................................ 303/36; 303/69
[58] Field of Search .................... 303/69, 70, 85, 33, 303/36, 37, 38

[56] References Cited

U.S. PATENT DOCUMENTS 3,472,562  10/1969  Washbourn ........................ 303/33
3,706,480  12/1972  Washbourn ........................ 303/69

Primary Examiner—Trygve M. Blix
Assistant Examiner—Reinhard J. Eisenzopf
Attorney, Agent, or Firm—Larson, Taylor and Hinds

[57] ABSTRACT

An accelerated release valve is proposed for brake control valves, especially direct release triple valves, the accelerated release being triggered by rapid collapse or discharge of quick service volume pressure at commencement of a brake releasing mode.

2 Claims, 2 Drawing Figures

BRAKE CONTROL VALVE APPARATUS

CROSS REFERENCES TO RELATED APPLICATIONS

This application is a continuation-in-part of Ser. No. 638,463, filed on Dec. 8, 1975, now U.S. Pat. No. 4,050,745.

This invention relates to brake control valve apparatus and relates particularly to the provision of an improved form of accelerated release in such apparatus.

The invention is applicable more especially to so-called triple valve apparatus for controlling the brakes of a train in which a number of such valves at least one per car are connected to a brake pipe which passes down the train interconnecting one car with the next. In normal operation of such a triple valve, the brakes are held off by a predetermined brake pipe pressure and at the same time an auxiliary reservoir is charged to a pressure which is approximately equal to the brake pipe pressure. In order to apply the brakes, fluid pressure is released from the brake pipe by a driver's brake valve and a pressure responsive member in the valve apparatus is displaced to allow auxiliary reservoir air to be transmitted to the brake cylinders until a value of auxiliary reservoir pressure is reached at which the valve apparatus laps off. A further reduction of brake pipe pressure results in more air being transmitted to the brake cylinders and a different lap pressure is attained. In order subsequently to release the brakes, the brake pipe pressure is recovered to its release value but owing to the length of the brake pipe, this recovery tends to be subject to a propagation delay down the train and a resultant uneven release of the brakes on the cars may tend to occur. The invention is concerned with improved means for alleviating this tendency and enabling quicker release.

In the specification of U.S. Pat. No. 3,706,480 there is described and claimed fluid operable brake control valve apparatus having a brake cylinder valve for controlling the supply of fluid pressure into and out of a brake cylinder, said valve being operable by a main pressure responsive member movable in response to changes of pressure when applied to a brake pipe and accelerated release valve means operable in response to release of fluid pressure from the brake cylinder to connect a charged accelerated release reservoir to the brake pipe to assist a change of pressure in the brake pipe causing such release.

The present invention provides a fluid operable brake control valve apparatus having a brake cylinder valve for controlling the supply of fluid pressure into and out of a brake cylinder, said valve being operable by a main pressure responsive member movable in response to changes of pressure when applied to a brake pipe, a quick service valve operable in response to such a change tending to cause a brake application for connecting a quick service volume to the brake pipe to enhance the change at commencement of an application, accelerated release valve means operable in response to release of fluid pressure from the quick service volume to connect a charged accelerated release reservoir to the brake pipe to assist a change of pressure in the brake pipe causing such release, a further pressure responsive member for operating said accelerated release valve, one side of said member being subject to quick service volume pressure and communicating with the other side thereof through a choke, and means for normally biassing said further pressure responsive member towards a position in which the accelerated release valve is closed.

The invention also provides a fluid operable brake control valve apparatus having a brake cylinder valve for controlling the supply of fluid pressure into and out of a brake cylinder, said valve being operable by a main pressure responsive member movable in response to changes of pressure when applied to a brake pipe, a quick service volume exhause valve operable in response to such a change tending to cause a brake application for connecting a quick service volume to the brake pipe to enhance the change at commencement of an application, accelerated release valve means operable in response to release of fluid pressure from the quick service volume to connect a charge accelerated release reservoir to the brake pipe to assist a change of pressure in the brake pipe causing such release, and a further pressure responsive member for operating said accelerated release valve, said further pressure responsive member having one side thereof connected to the outlet path from said quick service volume exhaust valve and the other side thereof connected to atmosphere.

Where the apparatus is a service braking control valve portion and is also provided with an emergency valve portion, which is operable to effect an emergency braking application which may follow a controlled service application, it may be desirable to provide means, such as a check valve, between said other side of the said further pressure responsive member and the brake pipe to enable a flow of fluid pressure therebetween, to prevent the accelerated release valve operating.

In the foregoing, it is to be understood that pressure applied to the brake pipe may be in the form of a reduced pressure or in the form of an increased pressure, although it will be appreciated that in most accepted forms of railway braking equipment, a brake application is achieved as in the apparatus described specifically herein by applying reduced pressure to the brake pipe.

Figure 2:
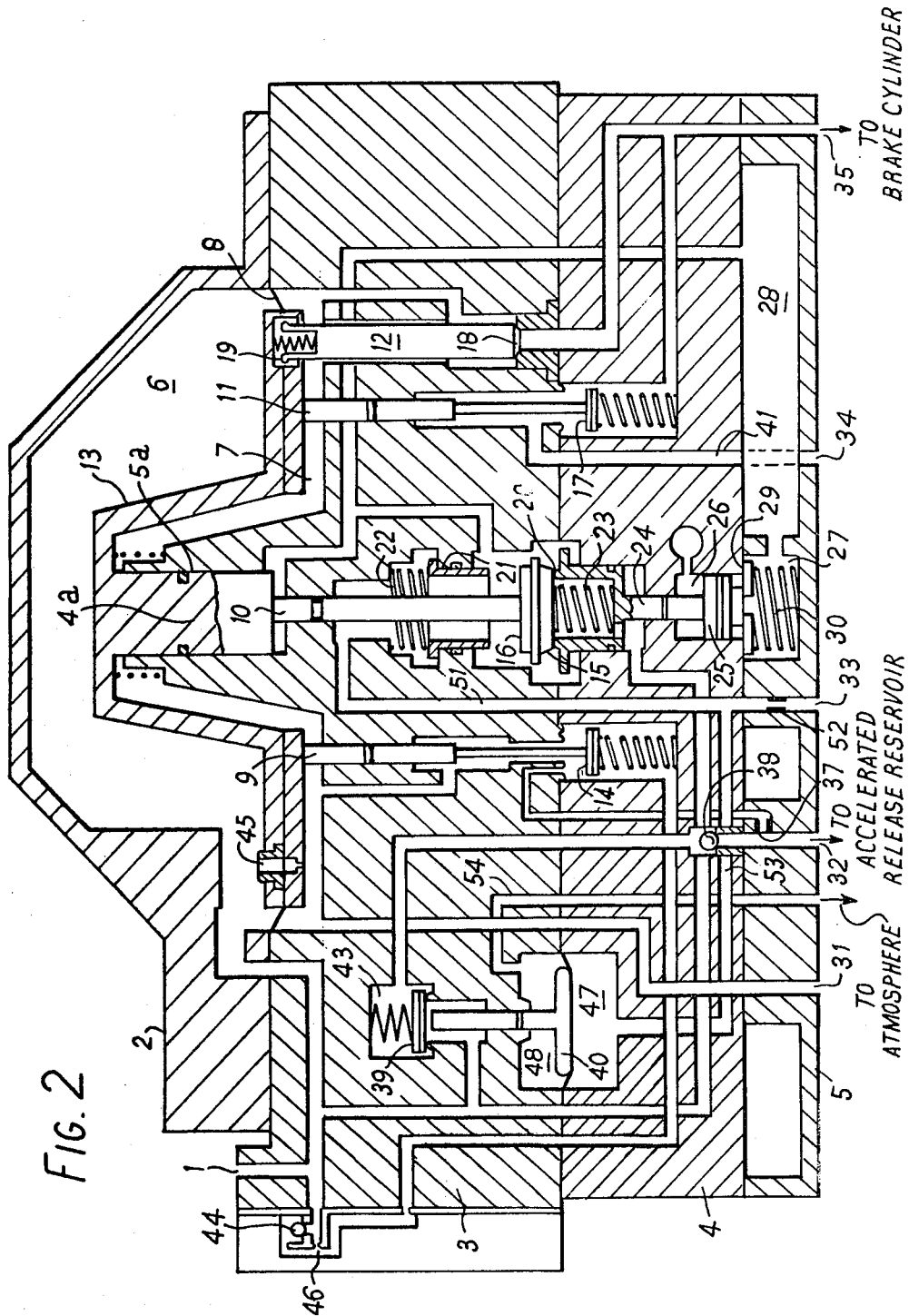

In order that the present invention may be more clearly understood and readily carried into effect, the same will be further described by way of an example with reference to FIGS. 1 and 2 of the accompanying drawings which illustrate in schematic form a brake control valve apparatus which makes use of one embodiment of the invention.

The apparatus shown in FIG. 1 of the drawings consists essentially of a triple valve connected to a brake pipe at a port denoted by the reference 1 and the apparatus comprises four main body sections 2, 3, 4 and 5 which are bolted with unshown bolts together with suitable intermediate seals, not shown, to complete the unit. Within the upper portion 2, there is provided a pressure responsive member 13 having a main stem 4a which is slidable within a passage in the section 3. Separation between the air volumes 6 and 7 on either side of the pressure responsive member is achieved by the provision of a diaphragm 8 clamped firstly into the pressure responsive member and secondly between the portions 2 and 3 referred to above, sufficient flexibility in the diaphragm being provided to permit unimpeded movement of the pressure responsive member.

The pressure responsive member 13 operably engages four principle valve stems denoted by references 9, 10, 11 and 12 respectively, the first three being sealingly slidable in the housing. Stem 9 carries an auxiliary reservoir charging valve and accelerated release reservoir charging valve dual closure member 14 operable to close off two concentric valve seats. Stem 10 carries a bulb inlet valve closure member 15 and a bulb exhaust valve closure member 16, stem 11 carries a brake cylinder exhaust valve closure member 17 and stem 12 itself constitutes a brake cylinder inlet valve closure member at its seating end portion 18. Additionally, it will be noted that the valve stem 12 is mounted to provide a certain amount of lost motion in the pressure responsive member 13 and is urged downwardly by a suitable internally provided housed spring 19 as shown. Each of the above mentioned valve closure members or the portion have an associated valve seat which does not require enumerating in itself. Particular attention may be drawn to the bulb inlet valve seat 20 and the slidable bulb exhaust valve seat 21, each of which are sealingly slidable within the housing between upper and lower stops. The requirements for the relative spacings of the valve seats under various conditions will be appreciated when the operation of the apparatus is considered in more detail. The sliding seat 21 is urged downwardly by a light spring 22 and the seat 20 is provided with a light spring 23 which is engagable with the respective closure member 15 as 15 approaches the closed position. Further, the sliding seat 20 is connected via a sealingly slidable connecting rod 24 to a piston 25 which is slidable in a cylinder, an upper chamber 26 of which is vented to atmosphere and a lower volume of which communicates with a chamber 27 connected to the quick service bulb chamber 28 of the apparatus. In the stable released position of the apparatus as shown, the piston 25 rests against a lower stop 29 which is normally supported by a suitably strong spring 30 in the housing.

In addition to the brake pipe port 1, the apparatus is provided with a port 31 for connection to an auxiliary reservoir, a port 32 for connection to an accelerated release reservoir, exhaust ports 33 and 34 and a brake cylinder connection port 35. It will be seen moreover that the accelerated release reservoir port 32 is connectable through choke 37, via an inlet valve with closure member 14 in the unseated condition thereof to the auxiliary reservoir. The accelerated release reservoir is thereby chargeable from the brake pipe. The accelerated release reservoir is further connected via a one-way check valve 38 to the input side of an accelerated release valve having a closure member 39 biassed to a closed position by a spring 43, this closure member being operable by a pressure responsive member 40 which is subject on the upper side to the pressure of the quick service bulb chamber 28 and the other side of the pressure responsive member 40 is connected only through a small choke 42 to the upper side. This member 40 is further urged downwardly by a suitable spring 43.

Referring now to the other principal connections in the apparatus, the brake pipe port 1 is connected to the upper chamber 6 of the apparatus, the input side of the bulb inlet valve, the output side of the accelerated release valve having movable member 39 and also via a check valve 44 to the input side of the auxiliary reservoir and accelerated release reservoir charging valve having dual closure member 14. The output side of the auxiliary reservoir charging valve is connected to the chamber 7 beneath the pressure responsive member amd this chamber is further connected to the auxiliary reservoir port 31 and to the input side of the brake cylinder inlet valve having closure member 18. The output side of the brake cylinder inlet valve is connected of course to the brake cylinder port 35. This port is also connected to the brake cylinder exhaust valve having closure member 17, the exhaust side of which is connected to the exhaust port 34.

The quick service bulb chamber 28 is connected on the one hand to the lower area of the main stem 4a of the pressure responsive member and on the other hand to the chamber within which the closure members 15 and 16 of the bulb inlet and exhaust valves operate. Communication is thereby provided between the bulb and the brake pipe on parting of the closure member 15 and the valve seat 20.

The quick service bulb volume is also connected to the upper chamber 48 above the pressure responsive member 40 via a passage 49 and the chamber 47 below 40 being connected via a check valve 50 to the brake pipe 1. The check valve 50 is an extremely lightly loaded check valve offering negligible resistance to fluid flow from chamber 47 in the event of the brake pipe pressure falling below that in 47.

A small restricted passage is provided at 45 through the pressure responsive member 13 and a similar passage is provided at 46 between the brake pipe and auxiliary reservoir. These passages are present for providing requisite long term pressure stability in the apparatus.

Considering the operation of the apparatus in general terms, it may be understood initially that the operation is in many respects substantially the same as that which occurs in previously known forms of triple valve. Thus, an unoperated state or release state of the brakes, is maintained by a predetermined brake pipe pressure above atmosphere being established at 1. Under these conditions, the main pressure responsive member and its stem 4a are in a position such as that shown in the drawing, where the brake cylinder is exhausted and the auxiliary reservoir is charged from the brake pipe to a substantially identical pressure. A brake application is achieved by a drop of brake pipe pressure and this permits air to be transmitted from the auxiliary reservoir into the brake cylinder up to the point at which a pressure drop occurs in the auxiliary reservoir to permit the apparatus to lap-off and to interrupt flow of air to the brake cylinder. The degree of braking pressure applied to the brake cylinder is dependent upon the reduction of brake pipe pressure which is initiated.

As mentioned above, the drawing shows the valve in the stable release position and with the apparatus fully charged from the brake pipe the auxiliary and brake pipe pressure are equal. There is in this position a resultant downward pressure on the pressure responsive member 13 due to the fact that the underside of the main stem 4a is at atmospheric pressure, the bulb inlet valve member 16 being separated from its associated seat 21. The pile comprising 13, 4a, 10, 16, 15, 20, 24 and 25 is therefore supported by the lower housed spring 30, the quick service inlet valve closure member 15 resting against its seat 20 and the brake cylinder inlet valve 18 being closed. Also, the accelerated release valve 39, under the influence of spring 43, is closed, the actuating member 40 thereof being in its retracted position as shown. The auxiliary reservoir charging valve is open. The brake cylinder exhaust valve is open and since, as mentioned above, the quick service exhaust valve member 16 is off its seat, the chamber 27 is at atmospheric pressure and no pressure is thereby exerted on the piston 25.

When the brake pipe pressure is reduced to apply the brake and as soon as the pressure difference, which subsequently acts upwards across the pressure responsive member 13, overcomes the resultant downward force mentioned above, the pressure responsive member 13 moves upwards followed under the influence of spring 23, by the valve closure members 15 and 16 unseating the bulb inlet valve. Brake pipe pressure therefore flows into the bulb chamber 28 accelerating the movement of the pressure responsive member and closing in sequence the charging valve having dual closure member 14, the brake cylinder exhaust valve 17 and the quick service exhaust valve.

Following closure of the quick service bulb exhaust valve, bulb pressure flows to the underside of the piston 25, and since the upper area of this piston is subjected only to atmospheric pressure, there is a resultant upward force which carries the slidable valve seat 20 upwards against the upper stop. Continued movement of the pressure responsive member in an upward direction lifts the sliding valve seat 21 upwards towards its upper stop. Quick service volume pressure is also applied via passage 49 to chamber 48 and thence via restriction 42 to chamber 47 so that the forces on 40 equalise at this bulb pressure.

Continued further upward movement of the pressure responsive member 13 causes the brake cylinder inlet valve 18 to open to make a brake application by connecting the auxiliary reservoir to the brake cylinder port 35 until the auxiliary reservoir pressure descends to approximately the pressure in the brake pipe whereupon the pressure responsive member 13 moves downwards to close off the brake cylinder inlet valve 18. Stability in the lap position is then provided by the quick service bulb pressure acting on the quick service valve member 15 and the valve seat 21.

In order to release the brakes, the brake pipe pressure is increased above the auxiliary reservoir pressure by about 1½ p.s.i. to overcome the resistance of the air load on the seat 21 and the valve members 15 and 16 can then commence to move downwards followed by the member 21. Valve closure member 16 cannot unseat until the member 21 comes against its lower stop. Owing to the upward movement of the inlet valve seat 20 referred to above in response to bulb pressure, the closure member 15 engages the seat 20 before disengagement between the seat 21 and its closure member 16 occurs. This prevents the connection of the brake pipe to a bulb chamber which is venting via the bulb exhaust valve during the release operation where the brake pipe pressure is required to be increasing.

Once the closure member 16 separates from its seat when the member 21 reaches its lower stop, bulb pressure is vented, the upward force on the pile is reduced and the whole assembly descends, being assisted by the venting of the area under the stem 4a and also by the fact that the bulb pressure which was previously applied to the piston 25, is now removed. Owing furthermore to the venting of the quick service (bulb) volume 28, the chamber 48 above the pressure responsive member 40 is also vented leaving the excess pressure in the chamber 47 held up temporarily by the presence of the restriction 42. Member 40 therefore moves upward temporarily opening the accelerated release valve 39 and permitting connection of the charged accelerated release reservoir at 32 to be connected to the brake pipe thus accelerating the release operation.

During the continued downward movement of 13, the brake cylinder exhaust valve 17 and the auxiliary reservoir charging valve 14 are opened and the assembly comes to rest on the lower stop 29 presented above the spring 30. It will be appreciated that the downward movement in practice is so rapid that overshoot can occur to the extent that the spring 30 may be depressed and final extreme stop position being provided by the lower stop for the member 20. However, the assembly returns to the position shown and the pressures in the brake pipe and the auxiliary reservoir recover to substantially their starting values.

In the manner of operation of accelerated release in the present embodiment, it will be appreciated that the accelerated release is piloted from the movement of the pressure responsive member 13 and conditional upon the actual commencement of a brake release operation owing to the fact that it is quick service volume exhausting which causes the temporary unseating of the valve 39.

The provision of the check valve 50 between the chamber 47 and the brake pipe is such as to ensure that in the event of an emergency braking operation taking place as a result of a further drop of brake pipe pressure following a normal service operation, the pressure of volume 47 can descend into the brake pipe and thus remain equal with chamber 48 to prevent operation of the accelerated release valve 39 in such circumstances.

In an alternative but not preferred manner of putting this improvement into effect, the venting of quick service volume pressure may be employed to itself generate a pressure for actuating the accelerated release valve. In such a case, the port 33 may be provided with a slight restriction and the brief increase of pressure generated upstream of this restriction can be employed to pressurise the chamber 47 below a pressure responsive member such as 40 (the upper chamber such as 48 being connected to atmosphere) thereby operates the valve 39. With such an arrangement, the sensitivities would require to be such as to prevent operation of valve 39, as a result of the brief discharge of brake pipe pressure which occurs via the quick service volume exhaust valve at the beginning of a brake application.

The above alternative is shown in FIG. 2, in which the same references are used for identical parts and in the main, the arrangement does not require re-description.

The difference lies in the fact that an additional restriction 52 is now provided in the outlet passage 51 to 33 from the quick service exhaust valve and a connection via passage 53 is provided upstream thereof to underside of the pressure responsive member 40. The region 48 above 40 is now connected to atmosphere via a passage 54 and the small passage 42 provided in the member 40 of FIG. 1 is now omitted along with the previously provided connection between the region 48 and the quick service bulb. Check valve 50 of FIG. 1 is also not required.

In operation of the apparatus of FIG. 2, in order to apply the brakes, the apparatus operates as described with reference to FIG. 1, and it will therefore be appreciated that the pressure responsive member settles to a lap condition in which the fall of brake pipe pressure caused by the driver's brake valve is balanced by a corresponding reduction of auxiliary reservoir pressure resulting from transmission of auxiliary reservoir pressure air to the brake cylinder via the unseated valve 18 which subsequently recloses in the lap condition. To release the brake, the brake pipe pressure is increased above the existing auxiliary reservoir pressure by about 1½ p.s.i. to overcome the resistance of the air load on the seat 21 and valve members 15 and 16 therefore commence to move downwards followed by the member 21. The valve closure member 16 is unable to unseat until the member 21 comes against its lower stop. Owing to the upward displacement of the quick service bulb inlet valve seat in response to the quick service bulb pressure during the application, the closure member 15 engages the seat 20 prior to disengagement of the seat 21 and its closure member 16.

When closure member 16 separates from the seat after the member 21 has reached its lower stop, the quick service bulb pressure is discharged to atmosphere via the passage 51 and the aforementioned restriction 52. The upward force on the area of the stem 4a therefore reduces and also the pressure acting beneath the piston 25 disappears.

Additionally, owing to the restriction 52 in the venting passage for the quick service bulb, there is a short period of time when an elevated pressure is exerted in the region 47 beneath the pressure responsive member 40 of the accelerated release valve means. Since the region 48 is vented to atmosphere, the pressure responsive member 40 rises to briefly unseat the valve member 39 and provide a communication between the accelerated release reservoir which is connected at the input port 32 via the check valve 38 and unseated valve member 39 to the brake pipe. A brief rush of air therefore occurs from the fully charged accelerated release reservoir into the brake pipe to assist the releasing operation.

As in the case of FIG. 1, during resultant continued downward movement of the pressure responsive member 13, the brake cylinder exhaust valve 17 and the auxiliary reservoir charging valve 14 are opened and the assembly again comes to rest on the lower stop 29 presented above the spring 30. It will be appreciated that the downward movement is again so rapid that a degree of overshoot may occur to the extent that the spring 30 may be depressed briefly but the assembly returns to the position shown in the drawing and the pressures in the brake pipe and the auxiliary reservoir recover to the normal regime pressure determined by the fully released brake pipe pressure.

Whilst in the apparatus of FIG. 2 the region 48 above 40 is connected via a passage 54 to atmosphere, the apparatus could operate equally well by providing a restricted passage like 44 of FIG. 1 in the member 40, the passage 54 being dispenced with. In that case the regions 47 and 48 will normally be at atmospheric pressure as previously and a rise of pressure in 47 due to release of air from the quick service bulb will operate the valve 39 in the same way.

With the form of accelerated release which operates in response to air released from the quick service bulb as described above with reference to FIG. 2, it is necessary to arrange the sensitivities of the apparatus to be such as to ensure that unseating of the valve 39 does not occur as a result of the brief discharge of brake pipe pressure which, it will be recalled, occurs via the quick service volume exhaust valve as a result of the separation of the valve member 15 from the seat 20 prior to engagement with the exhaust valve member 21 at the commencement of a brake application.

I claim:

1. A fluid operable brake control valve apparatus having a brake cylinder valve for controlling the supply of fluid pressure into and out of a brake cylinder, said valve being operable by a main pressure responsive member movable in response to changes of pressure when applied to a brake pipe, a quick service volume exhaust valve, having an outlet path and operable in response to such a change tending to cause a brake application, for connecting a quick service volume to the brake pipe to enhance the change at commencement of an application, accelerated release valve means operable in response to release a fluid pressure from the quick service volume to connect a charge accelerated release reservoir to the brake pipe to assist a change of pressure in the brake pipe causing such release, and a further pressure responsive member for operating said accelerated release valve, said further pressure responsive member having one side thereof connected to the outlet path from said quick service volume exhaust valve.

2. An apparatus as claimed in claim 1 wherein the other side of said further pressure responsive member is separated from said one side and is connected to atmosphere through a separate passageway to atmosphere.

* * * * *